(12) United States Patent
Kusayanagi et al.

(10) Patent No.: US 12,203,764 B2
(45) Date of Patent: Jan. 21, 2025

(54) INFORMATION PROCESSING DEVICE AND INFORMATION PROCESSING METHOD

(71) Applicant: Nissan Motor Co., Ltd., Kanagawa (JP)

(72) Inventors: Yoshinori Kusayanagi, Kanagawa (JP); Takura Yanagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 237 days.

(21) Appl. No.: 17/758,951

(22) PCT Filed: Jan. 17, 2020

(86) PCT No.: PCT/IB2020/000065
§ 371 (c)(1),
(2) Date: Jul. 15, 2022

(87) PCT Pub. No.: WO2021/144600
PCT Pub. Date: Jul. 22, 2021

(65) Prior Publication Data
US 2023/0050142 A1   Feb. 16, 2023

(51) Int. Cl.
*G01C 21/00*   (2006.01)
*G01C 21/34*   (2006.01)
*G06F 3/16*   (2006.01)

(52) U.S. Cl.
CPC ........... *G01C 21/3476* (2013.01); *G06F 3/16* (2013.01)

(58) Field of Classification Search
CPC ....... G01C 21/3476; G01C 21/00; G06F 3/16; G06Q 10/109; G06Q 30/015; G06Q 30/0201; G06Q 50/40; H04W 4/021

USPC ......................................................... 701/426
See application file for complete search history.

(56) References Cited

U.S. PATENT DOCUMENTS

| | | | | |
|---|---|---|---|---|
| 2010/0315217 | A1* | 12/2010 | Miura | B60W 30/18009 340/436 |
| 2017/0108348 | A1* | 4/2017 | Hansen | H04W 4/024 |
| 2020/0030522 | A1* | 1/2020 | Moyers | G01T 1/20 |

FOREIGN PATENT DOCUMENTS

| | | |
|---|---|---|
| JP | 2010078515 A | 4/2010 |
| JP | 2012057957 A | 3/2012 |
| JP | 2012198216 A | 10/2012 |
| JP | 2015092395 A | 5/2015 |
| JP | 2018077669 A | 5/2018 |

* cited by examiner

*Primary Examiner* — Shardul D Patel
(74) *Attorney, Agent, or Firm* — Osha Bergman Watanabe & Burton LLP

(57) ABSTRACT

An information processing device includes a controller, a ride detection device configured to detect a ride of a user, a storage device configured to store action data of the user, an output device configured to output question data for requesting an answer from the user, and an input device configured to receive an input from the user. The controller outputs, from the output device, output data including at least a question regarding an action of the user taken before riding in a vehicle in accordance with positional information of the vehicle when detecting the ride of the user based on a signal acquired from the ride detection device, acquires an answer to the question from the user as input data via the input device, and associates the input data with the positional information of the vehicle or a POI to store the associated data in a storage device.

12 Claims, 11 Drawing Sheets

POI
POSITIONAL INFORMATION: LATITUDE ○○ / LONGITUDE ○○
ATTRIBUTE: RAMEN SHOP

FIG. 7

| ATTRIBUTE OF POI | ESTIMATED ACTION | ACCURACY OF ESTIMATED ACTION: LOW | ACCURACY OF ESTIMATED ACTION: MIDDLE | ACCURACY OF ESTIMATED ACTION: HIGH |
|---|---|---|---|---|
| RESTAURANT | MEAL | WHAT DID YOU DO THERE? | • DID YOU EAT SOMETHING?<br>• DID YOU DRINK SOMETHING? | • WAS IT GOOD?<br>• DO YOU WANT TO COME TO HAVE IT AGAIN? |
| RESTAURANT | MEETING | WHAT DID YOU DO THERE? | • HAVING MEETING FOR SOMETHING?<br>• HAVING MEETING WITH SOMEONE? | • FINISHED WELL?<br>• WAS MR. (MRS.) … FINE? |
| SHOPPING MALL | MEAL | WHAT DID YOU DO THERE? | • DID YOU EAT SOMETHING?<br>• DID YOU DRINK SOMETHING? | • WAS IT GOOD?<br>• DO YOU WANT TO COME TO HAVE IT AGAIN? |
| SHOPPING MALL | SHOPPING | WHAT DID YOU DO THERE? | • DID YOU BUY SOMETHING?<br>• DID YOU FIND SOMETHING? | • DID YOU FIND SOMETHING REASONABLE?<br>• COULD YOU BUY SOMETHING GOOD? |
| SHOPPING MALL | APPOINTMENT | WHAT DID YOU DO THERE? | • WAITING FOR SOMEONE?<br>• MEETING MR. (MRS.) …? | • MEET ALL RIGHT?<br>• WAS MR. (MRS.) … FINE? |
| CLASS | EXERCISE | WHAT DID YOU DO THERE? | • DID YOU TAKE EXERCISE?<br>• SWIMMING? YOGA? DANCING? | • SWEAT WELL?<br>• REFRESH YOURSELF? |
| CLASS | LESSON | WHAT DID YOU DO THERE? | • TAKING LESSON?<br>• FLOWER ARRANGEMENT? TEA CEREMONY? CALLIGRAPHY? | • MAKE PROGRESS?<br>• SPIRITUALLY AWAKENED? |

FIG. 9

| | ACCURACY OF ESTIMATED ACTION: LOW | ACCURACY OF ESTIMATED ACTION: MIDDLE | ACCURACY OF ESTIMATED ACTION: HIGH |
|---|---|---|---|
| NUMBER OF ACTIONS IN ACTION HISTORY | SMALL | MIDDLE LEVEL | LARGE |
| PROBABILITY OF ACTION HISTORY | LOW | MIDDLE LEVEL | HIGH |
| ATTRIBUTE OF POI | SHOPPING MALL | SUPERMARKET | RAMEN SHOP |

INFORMATION PROCESSING DEVICE AND INFORMATION PROCESSING METHOD

TECHNICAL FIELD

The present invention relates to an information processing device and an information processing method.

BACKGROUND ART

A navigation device is known that displays an icon of a point of interest (POI) (Patent Literature 1). The invention disclosed in Patent Literature 1 stores a frequency of usage of POIs used by the user, and displays icons of POIs having a high usage frequency.

CITATION LIST

Patent Literature

Patent Literature 1: Japanese Unexamined Patent Application Publication No. 2012-57957

SUMMARY OF INVENTION

Technical Problem

The invention disclosed in Patent Literature 1, which simply displays the POIs with the high usage frequency, does not teach any function of recording actions of the user at the POIs.

To solve the conventional problem described above, the present invention provides an information processing device and an information processing method capable of storing actions of a user at POIs.

Technical Solution

An information processing device according to an aspect of the present invention outputs, from an output device, output data including at least a question regarding an action of a user taken before riding in a vehicle in accordance with positional information of the vehicle when detecting a ride of the user in the vehicle based on a signal acquired from a ride detection device, acquires an answer to the question from the user as input data via an input device, and associates the input data with the positional information of the vehicle or a POI to store the associated data in a storage device.

Advantageous Effects

The present invention can store actions of the user at POIs.

BRIEF DESCRIPTION OF DRAWINGS

FIG. 7 is a view explaining an accuracy of an estimated action according to the modified example of the present invention.

FIG. 9 is a view explaining a relation between an action history and an accuracy of an estimated action.

DESCRIPTION OF EMBODIMENTS

Figure 1:
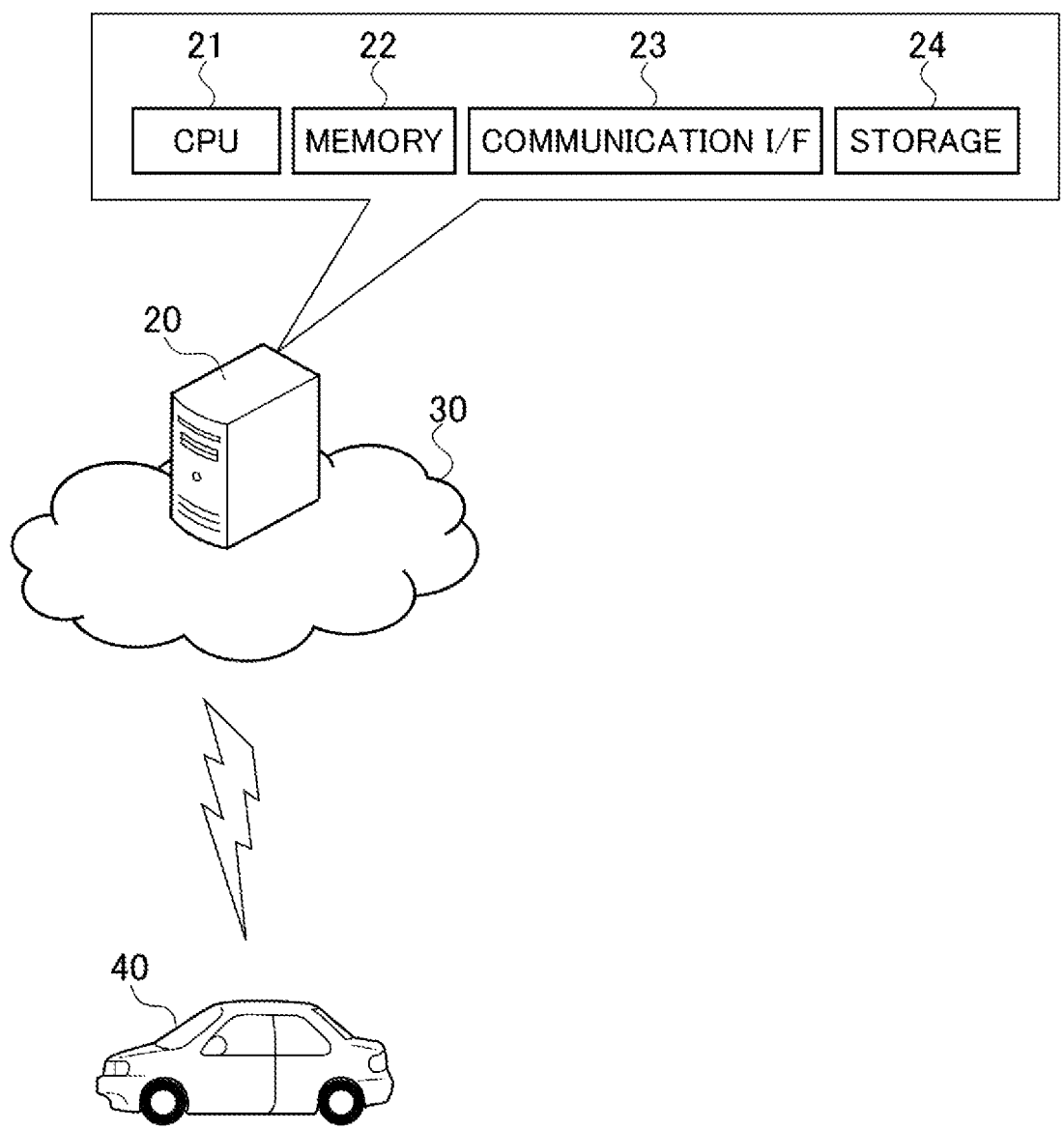
FIG. 1 is a view explaining the entire outline according to an embodiment of the present invention.

Some embodiments according to the present invention are described below with reference to the drawings. The same elements illustrated in the drawings are denoted by the same reference numerals, and overlapping explanations are not made below.

Entire Outline

The entire outline of the present embodiment is described below with reference to FIG. 1. As illustrated in FIG. 1, a vehicle 40 communicates with a computer 20 via a communication network 30.

The computer 20 includes a central processing unit (CPU) 21, a memory 22, a communication I/F 23, and a storage 24, which are electrically connected to each other via buses (not illustrated). An installed position of the computer 20 can be any location determined as appropriate.

The CPU 21 reads, into the memory 22, various kinds of programs stored in the storage 24, for example, and executes various types of instructions included in the programs. The memory 22 is a storage medium such as a read-only memory (ROM) and a random-access memory (RAM). The storage 24 is a storage medium such as a hard disk drive (HDD). The functions of the computer 20 may be provided through applications such as software as a service (SaaS) provided on the communication network 30. The computer 20 may be a server instead.

The communication I/F 23 is implemented by hardware such as a network adopter, various kinds of software for communication, or a combination thereof, and is configured so as to execute wired or wireless communication via the communication network 30 and the like.

The communication network 30 may be configured in either a wireless or wired mode or in both wireless and wired modes. The communication network 30 may also include the Internet. The computer 20 and the vehicle 40 in the present embodiment are connected to the communication network 30 in a wireless communication mode.

<Configuration Example of Information Processing Device>

An example of a configuration of the information processing device 100 mounted on the vehicle 40 is described below with reference to FIG. 2.

Figure 2:
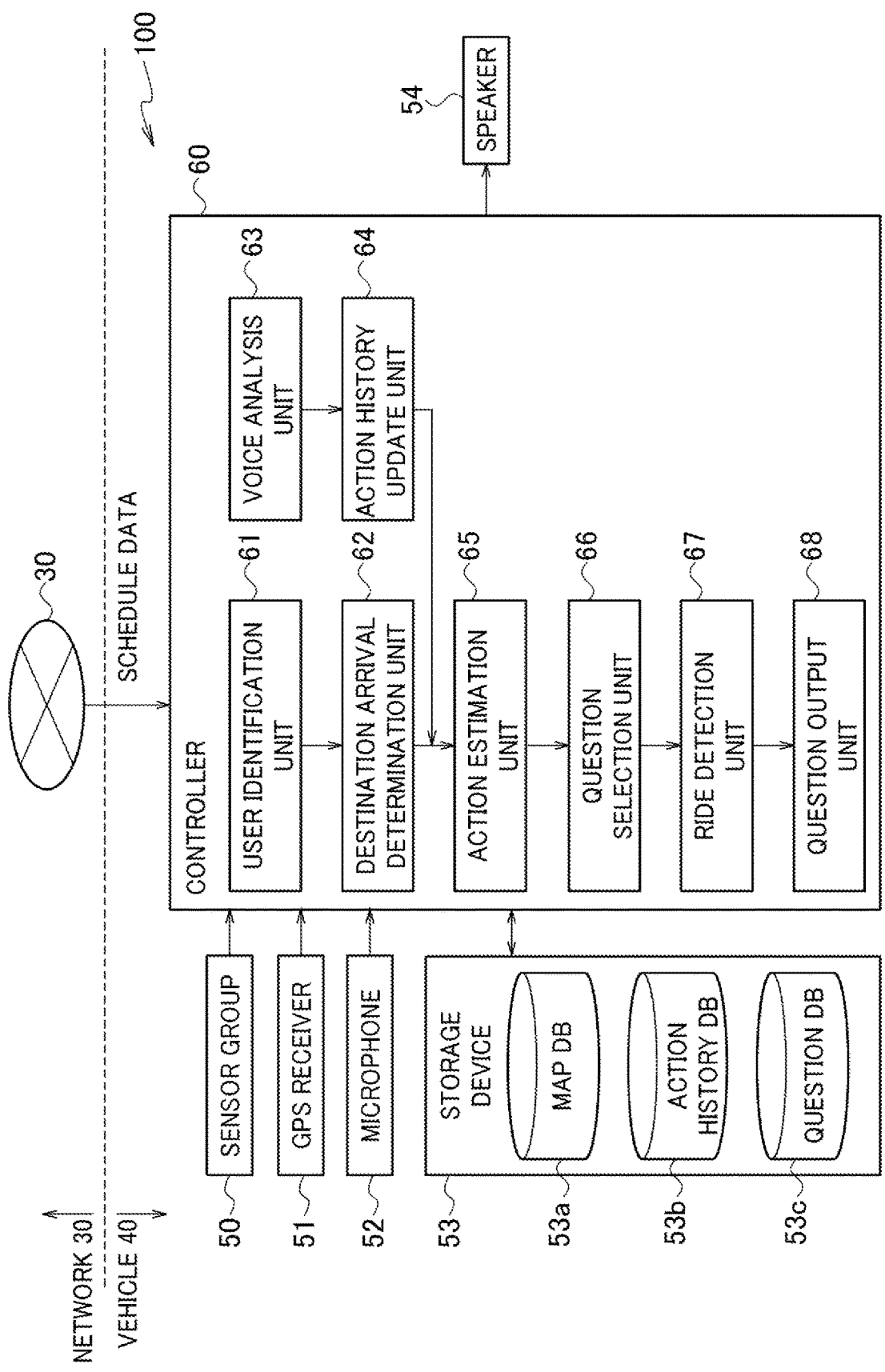
FIG. 2 is a schematic configuration diagram illustrating an information processing device according to the embodiment of the present invention.

As illustrated in FIG. 2, the information processing device 100 includes a sensor group 50, a GPS receiver 51, a microphone 52, a storage device 53, a speaker 54, and a controller 60.

The information processing device 100 may be mounted on either a vehicle equipped with an automated driving function or a vehicle without being equipped with an automated driving function. The information processing device 100 may be mounted on a vehicle capable of switching between automated driving and manual driving. The term "automated driving" as used in the present embodiment refers to a state in which at least any of a brake actuator, an accelerator actuator, and a steering wheel actuator is controlled without the intervention of operation of the user. The automated driving thus can include a state in which other actuators are operated by the user. The automated driving also refers to a state in which any control such as acceleration/deceleration control and lateral positioning control is executed. The term "manual driving" as used in the present embodiment refers to a state in which the user operates the brake pedal, the accelerator pedal, and the steering wheel, for example.

The sensor group 50 (a ride detection device) is used to detect a ride of the user in the vehicle. The sensor group 50 includes a pressure-sensitive sensor (also referred to as a seating-sensitive sensor) provided at a seat cushion, a camera for capturing the user in the compartment, and a sensor for detecting open and closed states of doors. The controller 60 uses signals obtained from the respective sensors so as to detect the ride of the user in the vehicle.

The GPS receiver 51 receives radio waves from an artificial satellite so as to detect positional information of the vehicle 40 on the ground. The positional information of the vehicle 40 detected by the GPS receiver 51 includes the latitude information and the longitude information. The GPS receiver 51 outputs the detected positional information of the vehicle 40 to the controller 60. The means of detecting the positional information of the vehicle 40 is not limited to the GPS receiver 51. For example, a means called odometry may be used to estimate the position of the vehicle 40. The odometry is a means of obtaining a moving amount and a moving direction of the vehicle 40 in accordance with a rotation angle and an angular velocity of the vehicle 40 so as to estimate the position of the vehicle 40.

The microphone 52 is used for inputting voice of the user.

The storage device 53 is a device different from a memory of the controller 60, and is a hard disk or a solid-state drive, for example. The storage device 53 stores a map database 53a, an action history database 53b, and a question database 53c.

The map database 53a stores map information, such as road information and facility information, necessary for a route guidance. The road information refers to information on the number of lanes on a road, boundary lines on a road, and a relation of connection of lanes. The map database 53a outputs the map information to the controller 60 in response to the request from the controller 60. While the present embodiment is illustrated with the case in which the information processing device 100 includes the map database 53a, the information processing device 100 does not necessarily include the map database 53a. The map information may be acquired through vehicle-to-vehicle communications or road-to-vehicle communications. When the map information is stored in a server externally located (for example, the computer 20 illustrated in FIG. 1), the information processing device 100 may acquire the map information from the server through communications as necessary. The information processing device 100 may regularly acquire the latest map information from the server so as to update the stored map information.

The map database 53a also stores information regarding points of interest (POIs). The term "POI" as used in the present embodiment refers to data indicating a specific point location. The POI includes at least an attribute and positional information (latitude, longitude) of the location. The attribute refers to information used for classifying POIs, such as a restaurant, a shopping mall, and a park. The POI may also include a name, an address, a phone number, and an icon of the location. The term "name" as used herein refers to, when the attribute is a restaurant, a specific name of the restaurant. The positional information of the POI may include an altitude in addition to a latitude and a longitude.

The action history database 53b stores actions of the user at POIs in association with the positional information of the vehicle 40 or the POIs. The actions of the user at the POIs are put in database form as a history.

The question database 53c stores the attribute of the respective POIs associated with questions regarding the actions of the user taken at the POIs.

The controller 60 is a general-purpose microcomputer including a central processing unit (CPU), a memory, and an input-output unit. A computer program is installed on the microcomputer so as to function as the information processing device 100. The microcomputer functions as a plurality of information processing circuits included in the information processing device 100 when the computer program is executed. While the present embodiment is illustrated with the case in which the software is installed to fabricate the respective information processing circuits included in the information processing device 100, dedicated hardware for executing each information processing as described below can be prepared to implement the information processing circuits. The respective information processing circuits may be composed of individual hardware. The controller 60 includes, as examples of the respective information processing circuits, a user identification unit 61, a destination arrival determination unit 62, a voice analysis unit 63, an action history update unit 64, an action estimation unit 65, a question selection unit 66, a ride detection unit 67, and a question output unit 68.

The speaker 54 is installed in the compartment of the vehicle 40 so as to output voice.

The user identification unit 61 identifies the user by use of a face image of the user captured when riding in the vehicle 40. In particular, the user identification unit 61 determines whether the captured face image conforms to or is similar to a face image preliminarily registered in the storage device 53. When the captured face image conforms to or is similar to the face image preliminarily registered in the storage device 53, the user identification unit 61 identifies the user riding in the vehicle 40 as a user preliminarily registered. The face identification described above can also be executed when the ignition is OFF.

Another method of identifying the user may use an ID of an intelligence key (also referred to as a smart key). A system using the intelligence key includes an antenna that transmits radio waves and a receiver that receives the radio waves, which are provided in both the vehicle and the key. When the user presses a switch provided on a door handle or a trunk, for example, the radio waves are transmitted from the antenna of the vehicle, and the key when receiving the radio waves automatically returns the radio waves. The receiver of the vehicle then receives the radio waves, so as to lock or unlock the doors. The radio waves transmitted from the key include an identification cipher that is preliminarily registered in the vehicle. Associating the identification cipher with the user information can identify the user.

The destination arrival determination unit 62 determines whether the vehicle 40 has arrived at a destination. The term "destination" as used in the present embodiment refers to a target location set by the user through a navigation device (not illustrated). The positional information on the destination is stored in the map database 53*a*. The destination arrival determination unit 62 checks the positional information of the vehicle 40 acquired from the GPS receiver 51 with the positional information of the destination stored in the map database 53*a*, and determines that the vehicle 40 has arrived at the destination when both information conforms to or substantially conforms to each other.

The voice analysis unit 63 analyzes voice of the user input via the microphone 52. The analyzing method as used herein is a conventionally-known method.

The action history update unit 64 stores actions that the user takes at POIs in the action history database 53*b* in association with the positional information of the vehicle 40 or the POIs, and updates the action history of the user at the POIs.

The action estimation unit 65 estimates the action of the user taken before riding in the vehicle. The term "action of the user taken before riding in the vehicle" as used in the present embodiment refers to an action that the user takes before the user rides in the vehicle 40. In particular, the action of the user taken before riding in the vehicle refers to an action that the user takes at a destination before riding in the vehicle 40.

The action estimation unit 65 also acquires schedule data of the user from the computer 20 through the communication network 30. The schedule data of the user includes information on an action plan of the user, such as a time "when", a place "where", and a thing "what". The schedule data may be acquired from a terminal (such as a smartphone) that the user holds.

The question selection unit 66 refers to the action estimated by the action estimation unit 65 and the question database 53*c* so as to choose a question put to the user. When the question selection unit 66 chooses the question, a signal indicating the chosen question is output to the question output unit 68.

The ride detection unit 67 detects a ride of the user in the vehicle in accordance with a signal acquired from the sensor group 50. In particular, the ride detection unit 67 detects the user riding in the vehicle when acquiring a signal indicating a change in resistance value from the pressure-sensitive sensor. The ride detection unit 67 also detects the user riding in the vehicle when detecting the presence of the user in the compartment through the analysis of the camera image. The ride detection unit 67 may detect the ride of the user when acquiring the signal indicating the change in the resistance value from the pressure-sensitive sensor after the detection of the open or closed state of the door. When the ride detection unit 67 detects the user riding in the vehicle, a signal indicating the detection of the ride is output to the question output unit 68.

The question output unit 68 outputs the question chosen by the question selection unit 66 when receiving the signal indicating the detection of the ride of the user 80. The question may be output by voice via the speaker 54, or may be output by text information to a display (such as a display of the navigation device). The present embodiment is illustrated with the case in which the question is output by voice via the speaker 54.

An example of a method of storing the action of the user taken at a POI is described below with reference to FIG. 3.

Figure 3:
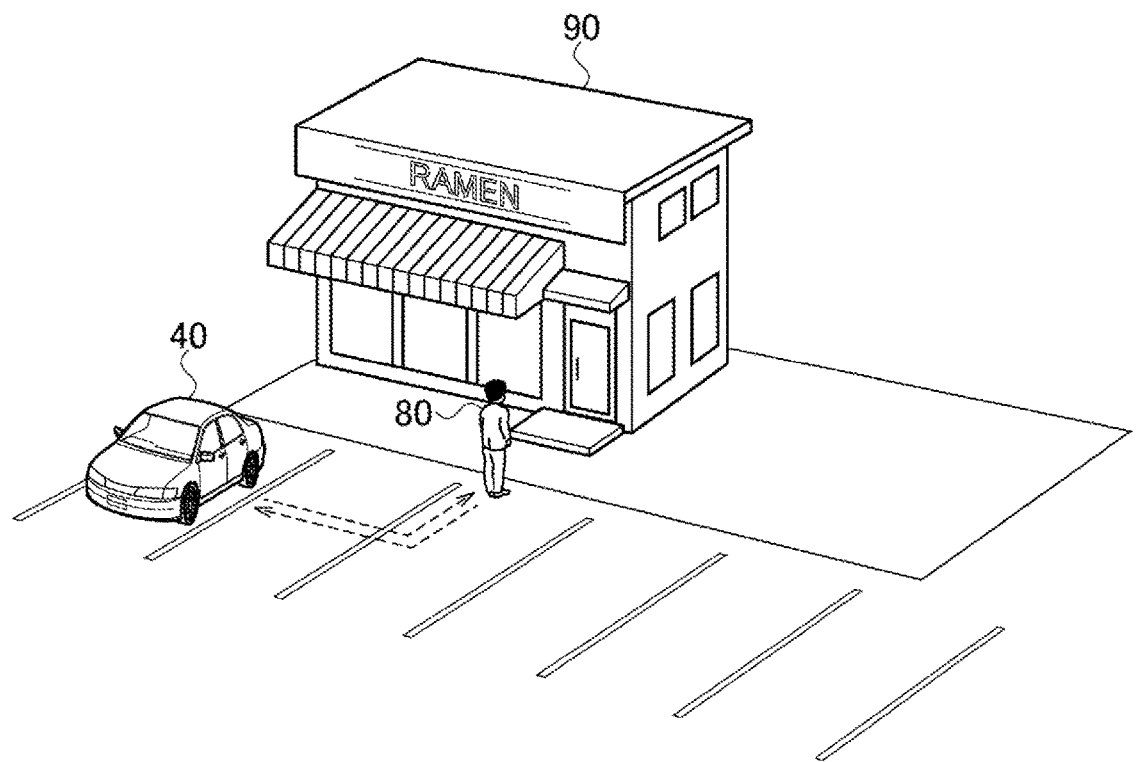
FIG. 3 is a view explaining an example of a POI according to the embodiment of the present invention.

The situation illustrated in FIG. 3 is a case in which the vehicle 40 arrives at a destination (a ramen shop 90 in this case) set by the user 80, and is parked in a parking space at the ramen shop 90. The user 80 gets out of the vehicle 40 and enters the ramen shop 90. The user 80 then leaves the ramen shop 90 and rides in the vehicle 40 after finishing things to be done at the ramen shop 90.

When the destination arrival determination unit 62 determines that the vehicle 40 has arrived at the destination, a signal indicating the determination result is output to the action estimation unit 65. The action estimation unit 65 when receiving the signal estimates the action of the user 80 taken before riding in the vehicle. As described above, the action of the user 80 taken before riding in the vehicle refers to an action that the user 80 takes at the destination when the user 80 is out of the vehicle 40. Since the destination of the user 80 in the case illustrated in FIG. 3 is the ramen shop 90, the action of the user 80 taken before riding in the vehicle refers to the action that the user 80 has taken at the ramen shop 90.

A method of estimating the action of the user 80 by the action estimation unit 65 is described below. The action estimation unit 65 first acquires the positional information of the vehicle 40 from the GPS receiver 51. In particular, the action estimation unit 65 acquires the positional information of the vehicle 40 when the vehicle 40 is determined to have arrived at the destination by the destination arrival determination unit 62.

The action estimation unit 65 checks the positional information of the vehicle 40 with the map database 53*a*, and acquires the POI at the current position (the parked position of the vehicle 40). In particular, as illustrated in FIG. 3, the action estimation unit 65 acquires the positional information of the POI (the latitude and the longitude) and the attribute of the POI (the ramen shop). In the case illustrated in FIG. 3, since the vehicle 40 is parked in the parking space at the ramen shop 90, the positional information of the vehicle 40 is presumed to conform to the positional information of the POI. The action estimation unit 65 acquires the positional information of the POI that conforms to or substantially conforms to the positional information of the vehicle 40. The action estimation unit 65 acquires the attribute of the POI associated with the positional information of the POI.

As described above, the action estimation unit 65 checks the positional information of the vehicle 40 with the map database 53*a*, so as to recognize that the current position is the ramen shop 90. The action estimation unit 65 then refers to table data in which the attribute of the POI is associated with the action type of the user stored in the storage device 53 so as to estimate the action of the user 80 taken before riding in the vehicle. The action type of the user as used in the present embodiment is a classification of the actions that the user could take at the POI. For example, when the attribute of the POI is a restaurant, two actions of taking a meal and having a meeting are stored in association with the restaurant as the action type of the user. The action type of the user does not necessarily include plural actions, and may include a single action. When the attribute of the POI is a ramen shop as illustrated in FIG. 3, the action of taking a meal is only associated with the ramen shop as the action type of the user. The action of the user 80 taken before riding in the vehicle in the case illustrated in FIG. 3 estimated by the action estimation unit 65 is thus to take a meal.

A signal indicating the estimated result obtained by the action estimation unit 65 is output to the question election unit 66. The question selection unit 66 when receiving the signal from the action estimation unit 65 refers to the action of the user 80 (taking a meal) taken before riding in the vehicle and the question database 53*c* so as to choose a question put to the user 80. As described above, the question database 53*c* stores the attribute of the POI in association with the questions regarding the actions of the user at the POI. The question election unit 66 refers to the action of the user 80 (taking a meal) taken before riding in the vehicle and the question database 53*c*, so as to choose a question regarding a meal. For example, a question with two choices that the user can answer with either YES or NO, such as "Did you have something for a meal?", is stored as a question regarding a meal. A question asking a particular answer, such as "What did you have for a meal?", is also stored. The question election unit 66 can optionally choose any question regarding a meal. When the question election unit 66 chooses the question, a signal indicating the chosen question is output to the question output unit 68.

The timing of asking the user the question can be, but not necessarily, immediately after the user 80 rides in the vehicle 40. The reason for this is that the probability that the user 80 could forget the action taken at the POI increases as the time elapsed after the user 80 rides in the vehicle 40 is longer. The ride detection unit 67 thus detects the ride of the user in accordance with the signal acquired from the sensor group 50. When the ride detection unit 67 detects the ride of the user 80, a signal indicating the detection result is output to the question output unit 68.

The question output unit 68, when receiving the signal indicating the detection of the ride of the user 80, asks the user the question chosen by the question selection unit 66 by voice via the speaker 54. The user 80 in this case is then asked a question, "Did you have something for a meal?", for example.

The user 80 answers the question by voice via the microphone 52. The voice analysis unit 63 analyzes the voice data of the user 80. When the user 80 answers "YES", the user 80 is determined to have taken a meal as the action taken at the ramen shop 90 through the voice analysis. The action history update unit 64 associates the positional information of the vehicle 40 with the action indicating that the user 80 has taken a meal at the ramen shop 90, and stores the associated information in the action history database 53*b*. The action history update unit 64 may also associate the POI with the action indicating that the user 80 has taken a meal at the ramen shop 90 and store the associated information in the action history database 53*b*. The present embodiment thus can store the action of the user 80 taken at the POI.

The data stored in the action history database 53*b* includes the date and time when the answer of the user is input, the positional information of the vehicle 40, the POI (the positional information and the attribute), and the action taken at the POI.

Another example of the method of storing the action of the user taken at a POI is described below with reference to FIG. 4.

Figure 4:
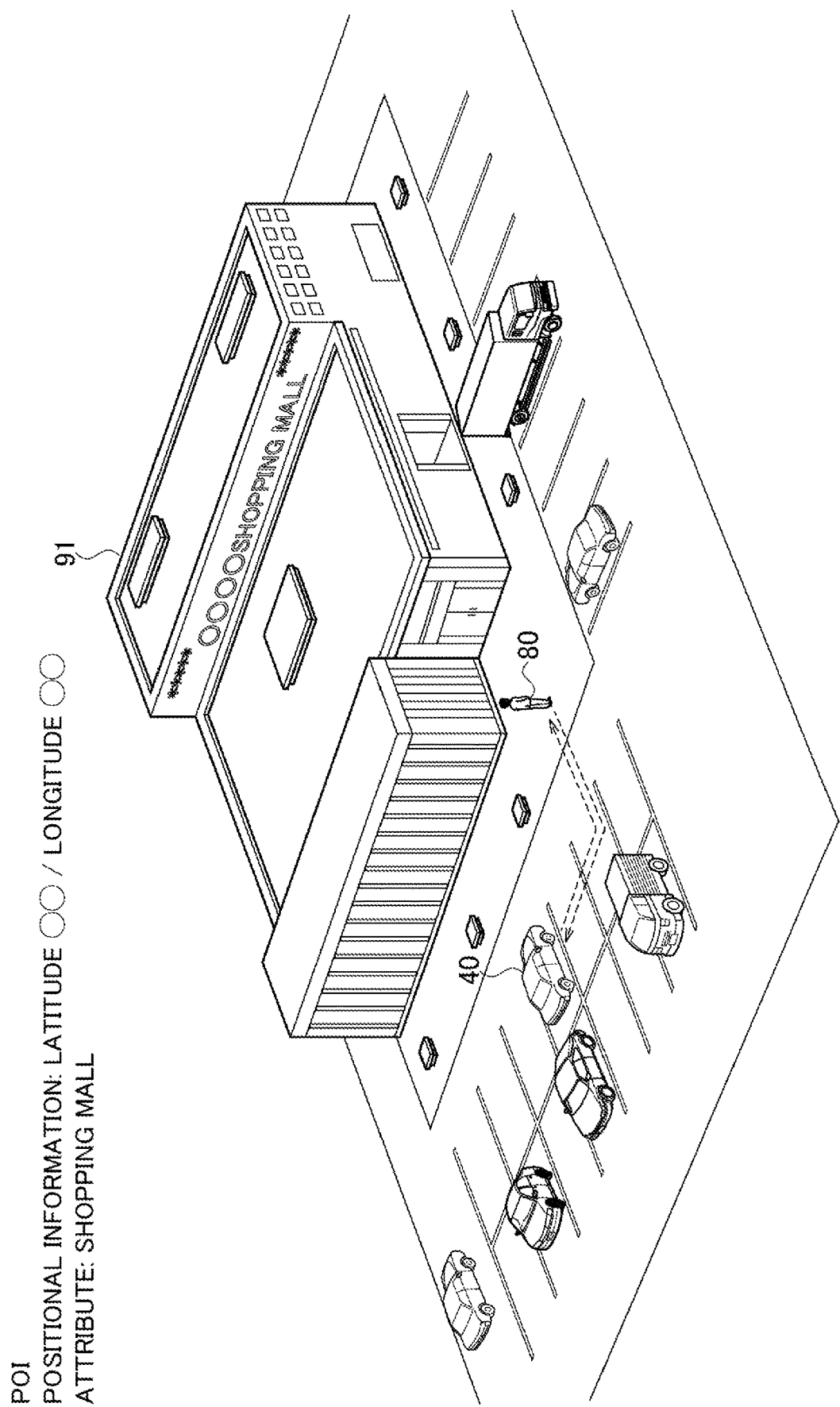
FIG. 4 is a view explaining another example of a POI according to the embodiment of the present invention.

The situation illustrated in FIG. 4 is a case in which the vehicle 40 arrives at a destination (a shopping mall 91 in this case) set by the user 80, and is parked in a parking space at the shopping mall 91. The user 80 gets out of the vehicle 40 and enters the shopping mall 91. The user 80 then leaves the shopping mall 91 and rides in the vehicle 40 after finishing things to be done at the shopping mall 91.

The action estimation unit 65 checks the positional information of the vehicle 40 with the map database 53*a*, and recognizes that the current position is the shopping mall 91, in the same manner as in the case illustrated in FIG. 3. The action estimation unit 65 then refers to the table data in which the attribute of the POI is associated with the action type of the user 80, so as to estimate the action of the user 80.

The shopping mall 91 in the present embodiment is a commercial complex occupied by a plurality of stores, restaurants, beauty salons, travel agencies, and fitness gyms, for example. The shopping mall is also referred to as a shopping center.

The type of the action of the user taken at the shopping mall 91 includes a plurality of actions such as taking a meal, doing shopping, waiting for someone, having a haircut, and taking exercise. To accurately estimate the action of the user 80 among the plural actions, the action estimation unit 65 refers to the schedule data of the user 80 acquired from the computer 20. As described above, since the schedule data includes the information on the action plan of the user 80, the action estimation unit 65 referring to the schedule data can estimate the action of the user 80 taken at the shopping mall 91 with a high accuracy. The schedule data in this case is assumed to include the information "taking a meal at the shopping mall 91" as the action plan of the user 80, for example. The action estimation unit 65 then refers to the schedule data so as to estimate that the action of the user 80 taken at the shopping mall 91 is to take a meal.

The question selection unit 66 when receiving the signal from the action estimation unit 65 refers to the action of the user 80 taken before riding in the vehicle and the question database 53*c* so as to choose a question to be put to the user 80. The question to be put to the user 80 in this case is assumed to be a question asking the user "Did you have something for a meal?", as in the case illustrated in FIG. 3.

The user 80 answers the question by voice via the microphone 52. The voice analysis unit 63 analyzes the voice data of the user 80. When the user 80 answers "YES", the user 80 is determined to have taken a meal at the shopping mall 91 through the voice analysis. The action history update unit 64 associates the positional information of the vehicle 40 with the action indicating that the user 80 has taken a meal at the shopping mall 91, and stores the associated information in the action history database 53*b*. The action history update unit 64 may also associate the POI with the action indicating that the user 80 has taken a meal at the shopping mall 91 and store the associated information in the action history database 53*b*. Referring to the schedule data thus can store the action of the user 80 taken at the POI with a high accuracy if there are plural kinds of actions that the user 80 would take at the POI.

The action estimation unit 65 may refer to the action history of the user 80 stored in the action history database 53*b* so as to estimate the action of the user 80. For example, the action estimation unit 65 may choose an action with a high frequency so as to estimate the action of the user 80 among the actions stored in the action history.

Figure 5:
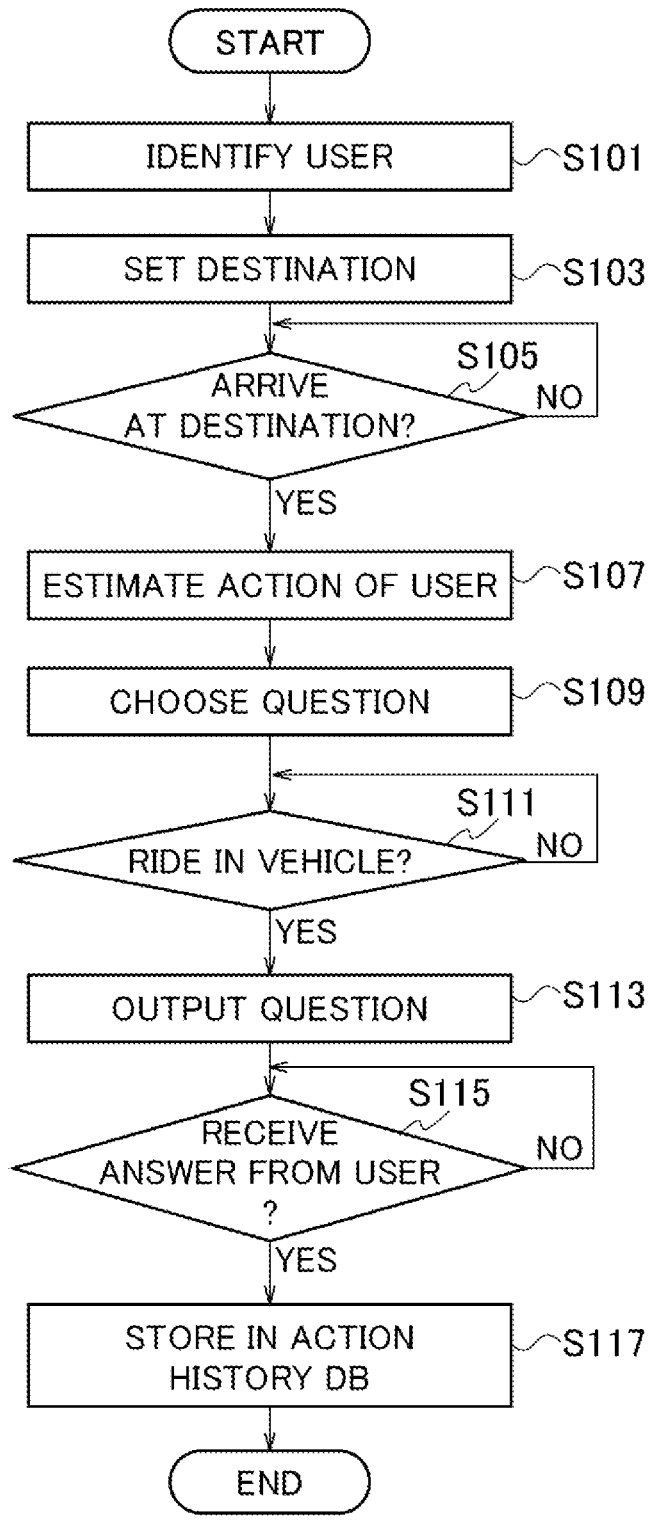
FIG. 5 is a flowchart explaining an example of an operation executed by the information processing device according to the embodiment of the present invention.

An example of operation of the information processing device 100 is described below with reference to the flowchart shown in FIG. 5.

In step S101, the user identification unit 61 identifies the user 80 riding in the vehicle 40 by use of the face image captured by the camera, the identification cipher transmitted from the intelligence key, and the like. The process proceeds to step S103, and the destination is then set by the user 80.

The process proceeds to step S105, and the destination arrival determination unit 62 checks the positional information of the vehicle 40 acquired from the GPS receiver 51 with the positional information of the destination stored in the map database 53*a* so as to determine whether the vehicle 40 has arrived at the destination. When the vehicle 40 is determined to have arrived at the destination (YES in step S105), the process proceeds to step S107. When the vehicle 40 is determined not to have arrived at the destination yet (NO in step S105), the process is on standby.

In step S107, the action estimation unit 65 estimates the action of the user 80 taken before riding in the vehicle. In particular, the action estimation unit 65 checks the positional information of the vehicle 40 acquired from the GPS receiver 51 with the map database 53a, and acquires the POI at the current position (the parked position of the vehicle 40). The action estimation unit 65 thus can recognize that the current position is the ramen shop 90 (refer to FIG. 3) or the current position is the shopping mall 91 (refer to FIG. 4). The action estimation unit 65 refers to the table data in which the attribute of the POI (the ramen shop or the shopping mall) is associated with the type of the action of the user 80, and estimates the action of the user 80 taken before riding in the vehicle. The signal indicating the estimation result obtained by the action estimation unit 65 is output to the question selection unit 66.

The process proceeds to step S109, and the question selection unit 66 when receiving the signal from the action estimation unit 65 refers to the action of the user 80 taken before riding in the vehicle and the question database 53c so as to choose the question to be put to the user 80. The signal indicating the question chosen by the question selection unit 66 is output to the question output unit 68.

The process proceeds to step S111, and the ride detection unit 67 detects the ride of the user 80 in accordance with the signal acquired from the sensor group 50. When the ride of the user is detected by the ride detection unit 67, the signal indicating the detection of the ride of the use 80 is output to the question output unit 68.

The process proceeds to step S113, and the question output unit 68, when receiving the signal indicating the detection of the ride of the user 80, asks the user 80 the question chosen by the question selection unit 66 by voice via the speaker 54.

When the answer is input by the voice via the microphone 52 (YES in step S115), the process proceeds to step S117. When the answer is not returned from the user 80 (NO in step S115), the process is on standby. The means of obtaining the answer from the user 80 is not limited to the voice, and the answer from the user 80 may be obtained through the operation on the touch panel.

In step S117, the voice analysis unit 63 analyzes the voice data of the user 80. The action history update unit 64 associates the positional information of the vehicle 40 with the action that the user has taken at the POI in accordance with the analyzed result obtained by the voice analysis unit 63, and stores the associated information in the action history database 53b. The action history update unit 64 may associate the POI with the action that the user 80 has taken at the POI and store the associated information in the action history database 53b.

Operational Effects

As described above, the information processing device 100 according to the present embodiment can achieve the following operational effects.

The information processing device 100 includes the controller 60, the ride detection device (the sensor group 50) that detects the ride of the user 80 in the vehicle 40, the storage device (the action history database 53b) that stores the action data of the user 80, the output device (the speaker 54) that outputs the question data for requesting the answer from the user 80, and the input device (the microphone 52) that receives the input from the user 80.

The controller 60, when detecting the ride of the user 80 by the signal obtained from the ride detection device, outputs the output data including at least the question regarding the action of the user 80 taken before riding in the vehicle 40 from the output device in accordance with the positional information of the vehicle 40. The controller 60 acquires the answer to the question from the user 80 as the input data via the input device. The controller 60 associates the input data with the positional information of the vehicle 40 or the POI, and stores the associated information in the storage device. The controller 60 thus can store the action of the user 80 taken at the POI with a high accuracy.

The controller 60 determines the question depending on the attribute of the POI determined in accordance with the positional information of the vehicle 40. Since the vehicle 40 in the case illustrated in FIG. 3 is parked in the parking space at the ramen shop 90, the attribute of the POI is determined to be the ramen shop 90 in accordance with the positional information of the vehicle 40. The storage device (the question database 53c) stores the attribute of the POI (the ramen shop) in association with the question regarding the action of the user (taking a meal) at the POI, so that the controller 60 can determine the question in accordance with the attribute of the POI.

The controller 60 may estimate the action of the user 80 taken before riding in the vehicle in accordance with the action history stored in the action history database 53b or the attribute of the POI. When the attribute of the POI is the ramen shop as illustrated in FIG. 3, the controller 60 can estimate that the action of the user taken before riding in the vehicle is to take a meal. The controller 60 may determine the action having a higher frequency as the estimated action of the user 80 among the actions stored in the action history. The controller 60 thus can estimate the action of the user 80 taken before riding in the vehicle with a high accuracy.

The controller 60 may acquire the data regarding the action plan of the user 80 (the schedule data of the user 80) through the communication, and refer to the schedule data so as to determine the question. The controller 60 thus can determine the appropriate question if there are several types of actions that the user would take at the POI, and can store the action of the user 80 at the POI with a high accuracy. The term "communication" as used herein refers to the communication with the computer 20 (the server) or the communication with the terminal that the user 80 holds.

The input data is data converted from the voice of the user 80, or data generated through the operation made by the user 80. The user 80 uses the microphone 52 or the touch panel as a means for answering the question. The user 80 using the microphone 52 or the touch panel can answer the question more easily.

The controller 60 detects the user 80 getting off the vehicle 40 after arriving at the destination set by the user 80, and then outputs the question when detecting the user 80 riding in the vehicle 40. The controller 60 thus can ask the user 80 the question at an appropriate timing.

The POI may be any of a POI located around the positional information of the vehicle 40, a destination set through the navigation device equipped in the vehicle 40, a POI included in the data regarding the action plan of the user 80 acquired through the communication, or a POI included in the data regarding the action history of the user 80 before riding in the vehicle acquired through the communication.

Modified Example

A modified example of the present embodiment is described below.

Figure 6:
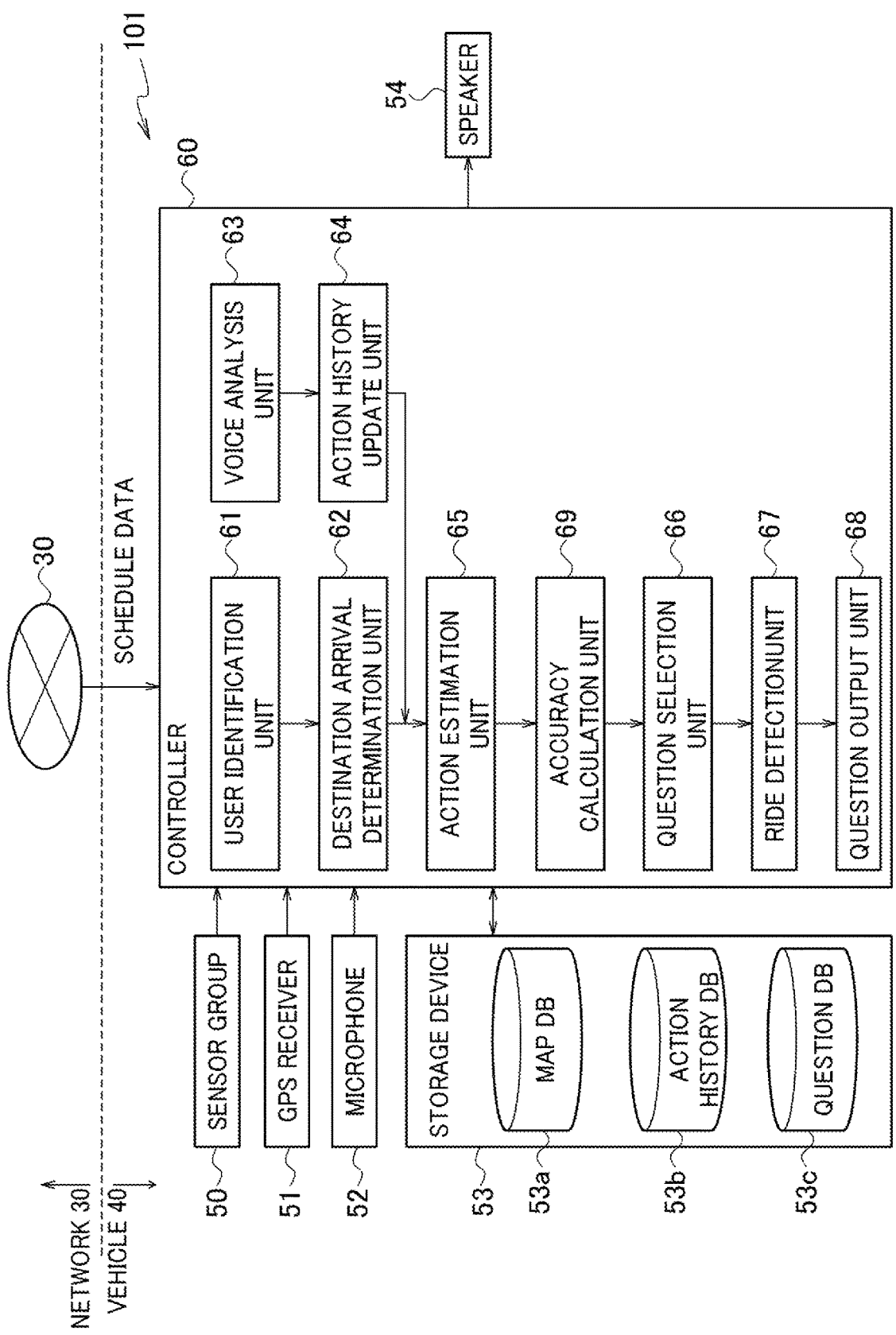
FIG. 6 is a schematic configuration diagram illustrating an information processing device according to a modified example of the present invention.

As illustrated in FIG. 6, an information processing device 101 according to the modified example further includes an accuracy calculation unit 69. The accuracy calculation unit 69 calculates an accuracy indicating likelihood (probability) of the action of the user 80 estimated by the action estimation unit 65. The estimation accuracy may be evaluated according to a three-grade level of a low level, a middle level, and a high level, or may be evaluated according to a probability (0% to 100%).

An example of a method of storing the action that the user 80 has taken at a POI is described below with reference to FIG. 7.

FIG. 7 shows the attribute of the POI illustrating a restaurant, a shopping mall, and a class. The term "class" as used in the present embodiment includes a swimming class a dance class, and a flower-arrangement class. The type of the action that the user takes at a restaurant includes taking a meal and having a meeting. The type of the action that the user takes at a shopping mall includes a taking a meal, doing shopping, waiting for someone, having a haircut, and taking exercise, as described above. The type of the action that the user takes at a class includes taking exercise and taking a lesson.

As described above, since the attribute of the POI is associated with the type of the action of the user, the action estimation unit 65 estimates the action of the user 80 from the type of the action described above, as shown in FIG. 7. The estimated action of the user 80 at the shopping mall in the case shown in FIG. 7 is any of taking a meal, doing shopping, and waiting for someone for illustration purposes.

While the accuracy of the action estimated by the action estimation unit 65 (also simply referred to below as an "estimated action) needs to be high when there are several possible actions to be estimated as shown in FIG. 7, the accuracy of the estimation is not always high. The reason for requiring the high accuracy for the estimation of the action is that the question put to the user 80 would be an inappropriate question if the estimated action is wrong. The action of the user, however, is not always estimated with a high accuracy, as described above.

To deal with this, the information processing device 101 according to the modified example calculates the accuracy of the estimated action, and determines the question depending on the calculated accuracy. The action history of the user 80 stored in the action history database 53b is used so as to calculate the accuracy of the estimated action. The modified example is illustrated below with two cases in which there is no action history of the user 80 stored in the action history database 53b and in which the action history of the user 80 stored in the action history database 53b includes actions taken with a predetermined number of times (for example, ten times).

First, the case in which there is no action history of the user 80 stored in the action history database 53b is described below.

When the destination of the user 80 is a restaurant, the action estimated by the action estimation unit 65 is either to take a meal or to have a meeting, as shown in FIG. 7. The action estimation unit 65 then estimates the action of the user that is either to take a meal or to have a meeting. The action estimation unit 65 may estimate, but not necessarily, the action of the user that is typically presumed to have a high probability, for example. An action having a high probability typically taken at a restaurant is to take a meal. This is also stored in the table data. The action estimation unit 65 thus may refer to the table data so as to estimate that the action of the user 80 is to take a meal when the attribute of the POI is a restaurant.

Alternatively, the action estimation unit 65 may refer to the action history of the user 80 stored in the action history database 53b so as to estimate the action of the user 80. For example, the action estimation unit 65 may choose an action having a high frequency so as to estimate the action of the user 80 among the actions stored in the action history. This method cannot be used when there is no action history.

The accuracy calculation unit 69 calculates the accuracy of the action of taking a meal estimated by the action estimation unit 65. The accuracy calculation unit 69 first refers to the action history database 53b, and acquires the action history of the user 80 taken at the restaurant. Since there is no action history of the user 80 at the restaurant in this case, the accuracy calculation unit 69 determines that the user 80 comes to the restaurant for the first time. The accuracy calculation unit 69 in this case determines that the probability is low that the action that the user 80 has taken at the restaurant is to take a meal. The reason for this is that the determination of whether the action that the user 80 takes at the restaurant is to take a meal or have a meeting is difficult. Although the action of taking a meal is typically presumed to have a higher probability, there is still a probability that the action of the user is to have a meeting. The accuracy calculation unit 69 then calculates that the accuracy of the action of taking a meal estimated by the action estimation unit 65 is low. A signal indicating the calculation result is then output to the question selection unit 66.

The question selection unit 66 when receiving the signal from the accuracy calculation unit 69 recognizes that the accuracy of the action of taking a meal estimated by the action estimation unit 65 is low. This recognition allows the question election unit 66 to avoid choosing the question regarding a meal and choose a question for asking the action of the user 80 itself. The reason for choosing the question for asking the action of the user 80 itself is to accumulate the action history in preparation for a case in which the user 80 would come to the restaurant again in the future.

An example of the question for asking the action itself is a question asking "What did you do there?", as shown in FIG. 7. The answer to the question from the user 80 is associated with the positional information of the vehicle 40 or the POI, and is stored in the action history database 53b. Asking the action of the user 80 itself when there is no action history of the user 80 stored in the action history database 53b can accumulate the action history in preparation for a case in which the user 80 would come to the restaurant again in the future. Asking the action of the user 80 itself can also avoid asking an inappropriate question.

Next, the case in which the action history of the user 80 stored in the action history database 53b includes the actions taken with a predetermined number of times (for example, ten times) is described below.

As in the case in which there is no action history of the user 80 stored in the action history database 53b, the destination of the user 80 in the following case is assumed to be a restaurant. The accuracy calculation unit 69 refers to the action history database 53b, and acquires the action history of the user 80 taken at the restaurant. A case is assumed below in which ten times of the actions in the action history include seven times of the actions of taking a meal and three times of the actions of having a meeting. Since the number of times of the actions of taking a meal is greater than the number of times of the actions of having a meeting, the accuracy calculation unit 69 calculates to determine that the probability corresponds to the middle level that the action of the user 80 taken at the restaurant is to take a meal. In other words, the accuracy calculation unit 69 calculates to determine that the accuracy of the action of taking a meal estimated by the action estimation unit 65 corresponds to the middle level. A signal indicating the calculation result is then output to the question selection unit 66. The accuracy of the action of taking a meal estimated by the action estimation unit 65 can be calculated as a probability. In the case in which ten times of the actions in the action history include seven times of the actions of taking a meal and three times of the actions of having a meeting, the probability can be calculated to be 70% that the action of the user 80 taken at the restaurant is to take a meal. The phrase "the accuracy of the action estimated by the action estimation unit 65 corresponds to the middle level" conforms to about 70% in terms of the probability.

The question selection unit 66 when receiving the signal from the accuracy calculation unit 69 determines that the probability that the action of the user 80 taken at the restaurant is to take a meal is high, and then chooses the question regarding a meal. Examples of the question regarding a meal in this case include a question asking "Did you eat something?" and a question asking "Did you drink something?", as shown in FIG. 7. The answer to the question from the user 80 is associated with the positional information of the vehicle 40 or the POI, and is stored in the action history database 53b. When ten times of the actions in the action history include three times of the actions of taking a meal and seven times of the actions of having a meeting, the question selection unit 66 chooses the question regarding a meeting. Examples of the question regarding a meeting in this case include a question asking "Are you having a meeting for something?" and a question asking "Are you having a meeting with someone?", as shown in FIG. 7.

While the above case is illustrated with the predetermined number of times that is ten times, the predetermined number of times is not limited to ten times. The greater number of times of the actions of the user 80 in the action history stored in the action history database 53b contributes to an improvement in the accuracy of the estimated action. The accuracy of the estimated action fluctuates as the number of times of the actions of the user 80 in the action history is smaller. When the number of times of the actions of the user 80 in the action history stored in the action history database 53b is less than five times, the number of times of the actions of the user 80 in the action history stored in the action history database 53b may be considered to be zero.

Similarly, when the destination of the user 80 is a shopping mall, and the accuracy of the action of the user 80 (taking a meal) estimated by the action estimation unit 65 is calculated to be the middle level, the question selection unit 66 chooses the question regarding a meal. The question regarding a meal is the same as described above, and explanations are not repeated below. When the accuracy of the action of the user 80 (doing shopping) estimated by the action estimation unit 65 is calculated to be the middle level, the question selection unit 66 chooses the question regarding shopping. Examples of the question regarding shopping in this case include a question asking "Did you buy something?" and a question asking "Did you find something?", as shown in FIG. 7. When the accuracy of the action of the user 80 (waiting for someone) estimated by the action estimation unit 65 is calculated to be the middle level, the question selection unit 66 chooses the question regarding an appointment. Examples of the question regarding an appointment in this case include a question asking "Are you waiting for someone?" and a question asking "Are you meeting Mr. (Mrs.) . . . ?", as shown in FIG. 7.

Similarly, when the destination of the user 80 is a class, and the accuracy of the action of the user 80 (taking exercise) estimated by the action estimation unit 65 is calculated to be the middle level, the question selection unit 66 chooses the question regarding exercise. Examples of the question regarding exercise include a question asking "Did you take exercise?" and a question asking "Swimming? Yoga? Dancing?", as shown in FIG. 7. When the accuracy of the action of the user 80 (taking a lesson) estimated by the action estimation unit 65 is calculated to be the middle level, the question selection unit 66 chooses the question regarding a lesson. Examples of the question regarding a lesson include a question asking "Taking a lesson?" a question asking "Flower arrangement? Tea ceremony? Calligraphy?", as shown in FIG. 7.

Calculating the accuracy of the action of the user 80 estimated by the action estimation unit 65 and determining the question depending on the calculated accuracy as described above can avoid asking an inappropriate question.

A case is assumed below in which ten times of the actions in the action history at the restaurant include ten times of the actions of taking a meal and no actions of having a meeting. Since all of the actions in the action history are to take a meal, the accuracy calculation unit 69 calculates to determine that the probability is high that the action of the user 80 taken at the restaurant is to take a meal. In other words, the accuracy calculation unit 69 calculates to determine that the accuracy of the action of the user 80 (taking a meal) estimated by the action estimation unit 65 is high. A signal indicating the calculation result is then output to the question selection unit 66. The probability in this case can be calculated to be 100% that the action of the user 80 taken at the restaurant is to take a meal.

The question election unit 66 when receiving the signal from the accuracy calculation unit 69 determines that the probability that the action of the user 80 taken at the restaurant is to take a meal is quite high, and then chooses, from the questions regarding a meal, a question delving deeply more than the question asked when the accuracy corresponds to the middle level. Examples of the question delving deeply in this case include a question asking "Was it good?" and a question asking "Do you want to come to have it again?", as shown in FIG. 7. The voice analysis unit 63 can classify the answer to this question from the user 80 into a positive answer and a negative answer. The action history update unit 64 can associate the classified result with the POI as classification data so as to store the data into the action history database 53b. Classifying the answer of the user 80 into a positive answer and a negative answer can ask the user 80 the question delving more deeply next time.

When ten times of the actions in the action history include no actions of taking a meal and ten times of the actions of having a meeting, the question selection unit 66 chooses the question delving deeply more than the question asked when the accuracy corresponds to the middle level among the questions regarding a meeting. Examples of the question delving deeply in this case include a question asking "Finished well?" and a question asking "Was Mr. (Mrs.) . . . fine?", as shown in FIG. 7.

Similarly, when the destination of the user 80 is a shopping mall, and the accuracy of the action of the user 80 (taking a meal) estimated by the action estimation unit 65 is calculated to be high, the question selection unit 66 chooses the question delving deeply more than the question asked when the accuracy corresponds to the middle level among the questions regarding a meal. The question delving deeply is the same as described above, and explanations are not repeated below. When the accuracy of the action of the user 80 (doing shopping) estimated by the action estimation unit 65 is calculated to be high, the question selection unit 66 chooses the question delving deeply more than the question asked when the accuracy corresponds to the middle level among the questions regarding shopping. Examples of the question delving deeply in this case include a question asking "Did you find something reasonable?" and a question asking "Could you buy something good?", as shown in FIG. 7. When the accuracy of the action of the user 80 (waiting for someone) estimated by the action estimation unit 65 is calculated to be high, the question selection unit 66 chooses the question delving deeply more than the question asked when the accuracy corresponds to the middle level among the questions regarding an appointment. Examples of the question delving deeply in this case include a question asking "Meet all right?" and a question asking "Was Mr. (Mrs.) . . . fine?", as shown in FIG. 7.

Similarly, when the destination of the user 80 is a class, and the accuracy of the action of the user 80 (taking exercise) estimated by the action estimation unit 65 is calculated to be high, the question selection unit 66 chooses the question delving deeply more than the question asked when the accuracy corresponds to the middle level among the questions regarding exercise. Examples of the question delving deeply in this case include a question asking "Sweat well?" and a question asking "Refresh yourself?", as shown in FIG. 7. When the accuracy of the action of the user 80 (taking a lesson) estimated by the action estimation unit 65 is calculated to be high, the question selection unit 66 chooses the question delving deeply more than the question asked when the accuracy corresponds to the middle level among the questions regarding a lesson. Examples of the question delving deeply in this case include a question asking "Make progress?" and a question asking "Spiritually awakened?", as shown in FIG. 7.

Calculating the accuracy of the action of the user 80 estimated by the action estimation unit 65 and determining the question depending on the calculated accuracy as described above can stimulate the conversations with the user 80.

The accuracy calculation unit 69 may refers to the schedule data of the user 80 when calculating the accuracy of the estimated action. Referring to the schedule data can improve the accuracy to be calculated. When there is no action history of the user 80 stored in the action history database 53*b*, the accuracy of the estimated action (taking a meal) is determined to be low, as described above. The action estimation unit 65 in this case refers to the schedule data when including the information "taking a meal at a restaurant", so as to calculate the accuracy of the estimated action (taking a meal) to be the middle level or to be high.

Next, an example of a structure of the questions stored in the question database 53*c* is described below with reference to FIG. 8.

Figure 8:
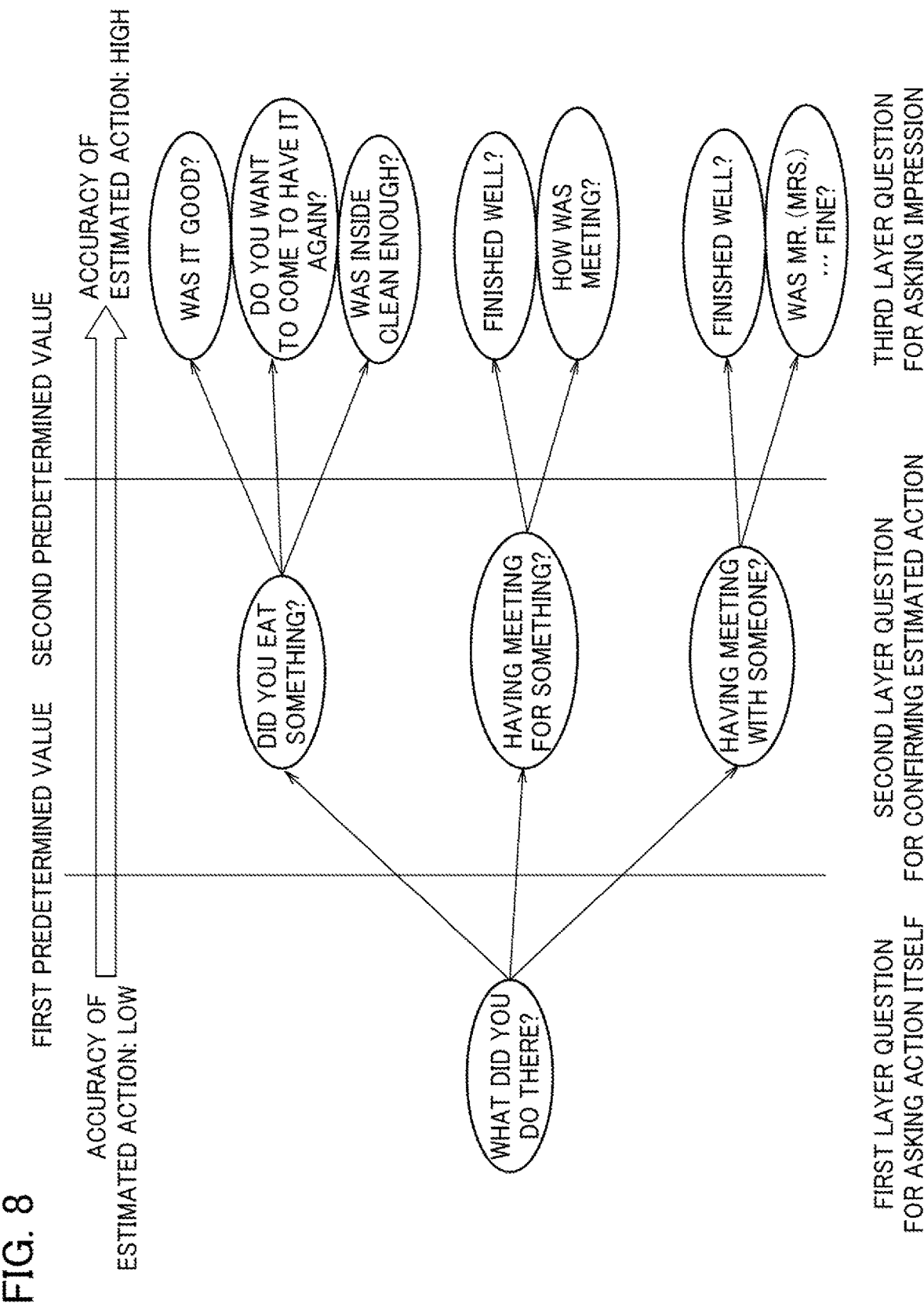
FIG. 8 is a view explaining a structure of questions according to the modified example of the present invention.

As illustrated in FIG. 8, the questions are classified into several layers (the first layer to the third layer), and are stored in the question database 53*c*. The question selection unit 66 chooses a question belonging to any of the layers depending on the accuracy of the estimated question calculated by the accuracy calculation unit 69. In particular, the question selectin unit 66 chooses a question included in the first layer when the accuracy of the estimated action is smaller than a first predetermined value. As shown in FIG. 8, the question included in the first layer is to ask the action of the user 80 itself.

The question selection unit 66 chooses a question included in the second layer when the accuracy of the estimated action is greater than or equal to the first predetermined value and less than or equal to a second predetermined value (the first predetermined value<the second predetermined value). As shown in FIG. 8, the question included in the second layer is to confirm the estimated action.

The question selection unit 66 chooses a question included in the third layer when the accuracy of the estimated action is greater than the second predetermined value. The question included in the third layer is to request the user 80 to answer an impression or an evaluation regarding the action taken before riding in the vehicle, as shown in FIG. 8. The third layer may include a question for requesting the user 80 to answer an impression or an evaluation regarding the POI. Examples of the question for requesting the user 80 to answer the impression or the evaluation regarding the action taken before riding in the vehicle include a question asking "Was it good?" and a question asking "Do you want to come to have it again?" when the action taken before riding in the vehicle is to take a meal, as shown in FIG. 8. An example of the question for requesting the user 80 to answer the impression or the evaluation regarding the POI is a question asking "Was the inside clean enough?" when the attribute of the POI is a restaurant, as shown in FIG. 8.

The probability calculated by the accuracy calculation unit 69 may be used as the first predetermined value and the second predetermined value shown in FIG. 8. For example, the first predetermined value may be set to 30%, and the second predetermined value may be set to 70%. The first layer corresponds to the state in which the estimated accuracy is low in the case shown in FIG. 7. The second layer corresponds to the state in which the estimated accuracy is at the middle level in the case shown in FIG. 7. The third layer corresponds to the state in which the estimated accuracy is high in the case shown in FIG. 7.

The question delves more deeply as the classification proceeds from the first layer to the third layer, namely, as the accuracy of the estimated action is higher. The action of the user 80 taken at the POI is stored in the action history database 53*a* so as to accumulate the action history. As the action history is accumulated more, the accuracy of the estimated action calculated by the accuracy calculation unit 69 is higher, and the question delves more deeply. The increase in the accumulation of the action history can stimulate the conversations with the user 80. While the questions shown in FIG. 8 are classified into the three layers, the classification is not limited to this case. The questions may delve more deeply so as to be classified further into the fourth layer and the fifth layer. The respective layers are set depending on the degree of abstraction or specificity of the questions allotted to the respective layers. In other words, the abstraction of the question is increased as the layer is higher, and the specificity of the question is increased as the layer is lower.

Next, a relationship between the action history stored in the action history database 53*b* and the accuracy of the estimated action calculated by the accuracy calculation unit 69 is described below with reference to FIG. 9.

As described above, the accuracy of the estimated action is lower as the action history stored in the action history database 53b is smaller. The accuracy of the estimated action is higher as the action history stored in the action history database 53b is greater.

Similarly, the accuracy of the estimated action is lower as the probability of the action history stored in the action history database 53b is lower. The accuracy of the estimated action is higher as the probability of the action history stored in the action history database 53b is greater. The above explanations are made with the case in which the probability that the action of the user 80 taken at the restaurant is to take a meal is 70% when ten times of the actions in the action history include seven times of the actions of taking a meal and three times of the actions of having a meeting. The probability of 70% corresponds to the probability of the action history.

The accuracy calculation unit 69 does not necessarily need to refer to the action history stored in the action history database 53b upon the calculation of the accuracy of the estimated action. It is difficult to estimate the action that the user 80 has taken at the POI when the attribute is a shopping mall as described above, since there are a lot of possible actions that the user 80 would take. The accuracy of the estimated action is thus decreased. When the attribute of the POI is a ramen shop, the accuracy of the estimated action is increased since the action that the user 80 would take can be specified. When the attribute of the POI is a supermarket, the action that the user 80 would take can be substantially limited to shopping, and the accuracy of the estimated action is thus determined to correspond to the middle level. The accuracy calculation unit 69 thus can calculate the accuracy of the estimated action only by use of the attribute of the POI without referring to the action history stored in the action history database 53b.

Figure 10:
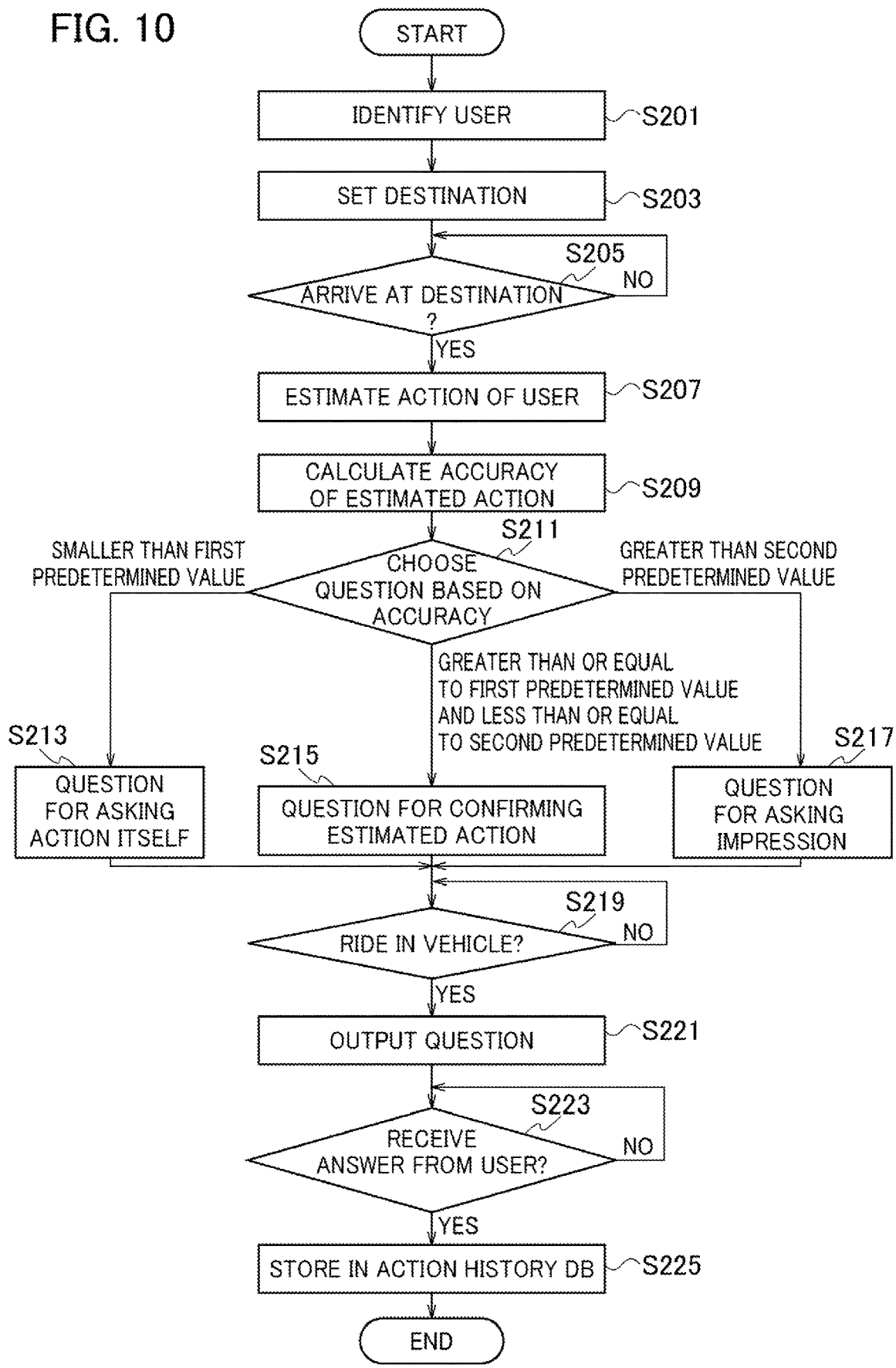
FIG. 10 is a flowchart explaining an example of an operation executed by the information processing device according to the modified example of the present invention.

An example of operation of the information processing device 101 according to the modified example is described below with reference to the flowchart shown in FIG. 10. The processing in steps S201 to 207 and 219 to 225 is the same as the processing in steps S101 to S107 and S111 to S117, and overlapping explanations are not repeated below.

In step S209, the accuracy calculation unit 69 calculates the accuracy indicating the likelihood (the probability) of the action of the user 80 estimated by the action estimation unit 65.

The process proceeds to step S211, and the question selection unit 66 chooses the question belonging to any of the layers depending on the accuracy of the estimated action calculated by the accuracy calculation unit 69 (refer to FIG. 8). In particular, the question selection unit 66 chooses the question for asking the action of the user 80 itself when the accuracy of the estimated action is smaller than the first predetermined value (step S213). The question selection unit 66 chooses the question for confirming the estimated action when the accuracy of the estimated action is greater than or equal to the first predetermined value and less than or equal to the second predetermined value (in step S215). The question selection unit 66 chooses the question for requesting the user 80 to answer the impression or the evaluation regarding the action taken before riding in the vehicle or the question for requesting the user 80 to answer the impression or the evaluation regarding the POI when the accuracy of the estimated action is greater than the second predetermined value (step S217).

Operational Effects

As described above, the information processing device 101 according to the modified example can achieve the following operational effects.

The controller 60 calculates the accuracy of the estimated action in accordance with the action history stored in the action history database 53b or the attribute of the POI, and determines the question depending on the calculated accuracy of the estimated action. This can avoid asking an inappropriate question.

The questions are classified into the plural layers (refer to FIG. 8). The controller 60 determines the question belonging to any of the layers as output data depending on the accuracy of the estimated action. The determination of the question depending on the accuracy of the estimated action can stimulate the conversations with the user 80. The controller 60 may determine the abstraction of the question depending on the accuracy of the estimated action so as to define the determined question as the output data.

The output data includes the question for requesting the user 80 to answer the action taken before riding in the vehicle, the question for requesting the user 80 to answer the impression or the evaluation regarding the action taken before riding in the vehicle, and the question for requesting the user 80 to answer the impression or the evaluation regarding the POI. Using various kinds of questions can stimulate the conversations with the user 80.

The controller 60 classifieds the answer of the user 80 into the positive answer and the negative answer, and associates the classified result with the POI to store the classification data in the action history database 53b. The classification of the answer of the user 80 into the positive answer and the negative answer can provide the question delving more deeply when asking the user 80 next time.

The controller 60 may output the classification data associated with the POI in accordance with the positional information of the vehicle 40. In a case in which the answer of the user 80 regarding a meal at the ramen shop 90 is assumed to be the positive answer indicating "It was good", the controller 60 may output the voice saying "The ramen was good, wasn't it?" when the vehicle 40 is traveling around the ramen shop 90. This can stimulate the conversations with the user 80.

The respective functions described in the embodiment above can be implemented by one or plural processing circuits. The respective processing circuits include a programed processing device, such as a processing circuit including an electrical circuit. The respective processing circuits also include an application-specific integrated circuit (ASIC) configured to execute the functions described above and a device such as a conventional circuit component.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

Figure 11:
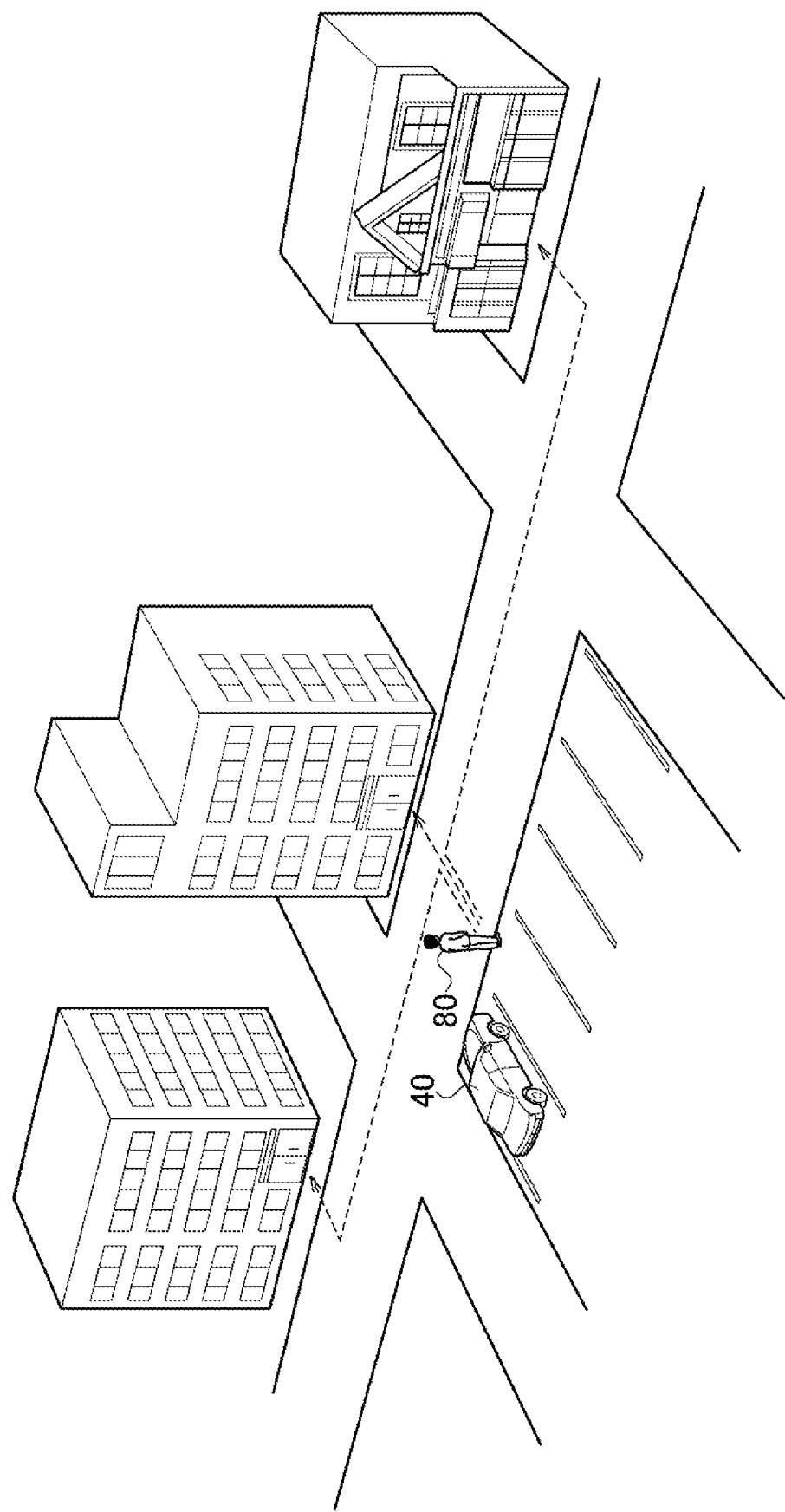
FIG. 11 is a view explaining another embodiment of the present invention.

FIG. 3 illustrates the case in which the vehicle 40 is parked in the parking space at the ramen shop 90, and the positional information of the vehicle 40 thus can be presumed to conform to the positional information of the POI, as described above. However, the destination does not always provide a parking space. When there is no parking space at the destination, the user 80 would try to park the vehicle 40 in a coin-operated parking lot around the destination, and then walk toward the destination from the parking lot, as illustrated in FIG. 11, for example. The positional information of the vehicle 40 in this case does not conform to the positional information of the destination (the positional information of the POI). The positional information of the vehicle 40 associated with the action of the user 80 taken before riding in the vehicle 40 and stored together thus cannot be used as the effective data.

To deal with this, the information processing device 100 may associate the positional information of the terminal held by the user (referred to as a "user's terminal") with the action of the user 80 taken before riding in the vehicle, and store the information in the action history database 53b. In particular, the information processing device 100 acquires the positional information of the user's terminal through the communication when the user arrives at the destination. The information processing device 100 is herein presumed to be configured to be able to communicate with the user's terminal. For example, the information processing device 100 includes a receiver that receives data transmitted from the user's terminal. The information processing device 100 refers to information in a guiding application installed in the user's terminal, so as to determine whether the user 80 has arrived at the destination.

The information processing device 100 estimates the action of the user 80 at the destination in accordance with the positional information acquired from the user's terminal. The information processing device 100 asks the user 80 a question regarding the estimated action. The information processing device 100 then associates the positional information acquired from the user's terminal with the action of the user 80 taken before riding in the vehicle 40, and stores the information in the action history database 53b. This can accurately store the action of the user 80 taken at the POI if the parked position of the vehicle 40 is away from the position of the destination (the position of the POI).

REFERENCE SIGNS LIST

40 VEHICLE
50 SENSOR GROUP
51 GPS RECEIVER
52 MICROPHONE
53 STORAGE DEVICE
53a MAP DATABASE
53b ACTION HISTORY DATABASE
53c QUESTION DATABASE
54 SPEAKER
60 CONTROLLER
61 USER IDENTIFICATION UNIT
62 DESTINATION ARRIVAL DETERMINATION UNIT
63 VOICE ANALYSIS UNIT
64 ACTION HISTORY UPDATE UNIT
65 ACTION ESTIMATION UNIT
66 QUESTION SELECTION UNIT
67 RIDE DETECTION UNIT
68 QUESTION OUTPUT UNIT
69 ACCURACY CALCULATION UNIT
100, 101 INFORMATION PROCESSING DEVICE

The invention claimed is:

1. An information processing device comprising:
a controller;
a sensor group configured to detect a ride of a user in a vehicle;
a storage configured to store data regarding points of interest (POIs) including, for each POI, positional information of the POI and an attribute of the POI in association with an action type in which an action that the user can take at the POI is classified, and to store action history data of the user;
a speaker configured to output question data for requesting an answer from the user; and
a microphone configured to receive an input from the user, the controller being configured to:
refer to the data stored in the storage to determine an attribute of a POI in accordance with a positional information of the vehicle when detecting the ride of the user in the vehicle based on a signal acquired from the sensor group;
estimate an action type of an action that the user may have taken at the POI before riding in the vehicle depending on the action type associated with the determined attribute of the POI;
calculate an accuracy indicating probability of the estimated action type, depending on the stored action history data and/or the determined attribute of the POI;
determine a question regarding the action of the user taken before riding in the vehicle depending on the calculated accuracy of the estimated action type;
output, from the speaker, output data including at least the determined question;
acquire an answer to the question from the user as input data via the microphone; and
associate the input data with the positional information of the vehicle or the POI to store the associated data in the storage.

2. The information processing device according to claim 1, wherein the POI is any of a POI located around the positional information of the vehicle, a destination set through a navigation device equipped in the vehicle, a POI included in data regarding an action plan of the user acquired through communication, or a POI included in data regarding an action history of the user before riding in the vehicle acquired through the communication.

3. The information processing device according to claim 1, wherein the controller determines the question depending on the attribute of the POI determined in accordance with the positional information of the vehicle.

4. The information processing device according to claim 1, wherein the controller acquires data regarding an action plan of the user through communication, and refers to the data regarding the action plan of the user so as to determine the question.

5. The information processing device according to claim 1, further comprising a receiver configured to receive data transmitted from a terminal that the user holds, wherein the controller determines the question in accordance with positional information transmitted from the terminal of the user before riding in the vehicle.

6. The information processing device according to claim 1, wherein the controller determines abstraction of the question depending on the calculated accuracy of the estimated action type, and determines the determined question as output data.

7. The information processing device according to claim 1, wherein the output data includes a question for requesting the user to answer the action taken before riding in the vehicle, a question for requesting the user to answer an impression or an evaluation regarding the action taken before riding in the vehicle, and a question for requesting the user to answer an impression or an evaluation regarding the POI.

8. The information processing device according to claim 1, wherein the controller classifies the answer into a positive answer and a negative answer, and associates a classified result as a classification data with the POI and stores the data in the storage.

9. The information processing device according to claim 8, wherein the controller outputs the classification data associated with the POI in accordance with the positional information of the vehicle.

10. The information processing device according to claim 1, wherein the input data is any of data converted from voice of the user or data generated through an operation made by the user.

11. The information processing device according to claim 1, wherein the controller detects the user getting off the vehicle after arriving at a destination set by the user, and outputs the question when detecting the ride of the user.

12. An information processing method using an information processing device, the method comprising:

detecting a ride of a user in a vehicle by a sensor group;

storing data regarding points of interest, or POIs, including, for each POI, positional information of the POI and an attribute of the POI in association with an action type in which an action that the user can take at the POI is classified, and action history data of the user, in a storage;

referring to the data stored in the storage to determine an attribute of a POI in accordance with a positional information of the vehicle when detecting the ride of the user in the vehicle based on a signal acquired from the sensor group;

estimating an action type of an action that the user may have taken at the POI before riding in the vehicle depending on the action type associated with the determined attribute of the POI;

calculating an accuracy indicating probability of the estimated action type, depending on the stored action history data and/or the determined attribute of the POI;

determining a question regarding the action of the user taken before riding in the vehicle depending on the calculated accuracy of the estimated action;

acquiring an answer to the question from the user as input data via a microphone; and associating the input data with the positional information of the vehicle or a POI to store the associated data in the storage.

* * * * *